United States Patent [19]
Kononenko et al.
[11] 3,980,413
[45] Sept. 14, 1976

[54] DEVICE FOR BRIQUETTING LOOSE MATERIALS

[76] Inventors: Vadim Grigorievich Kononenko, ulitsa Chkalova, 15, kv. 12; Valery Pavlovich Bozhko, ulitsa Chkalova, 13, kv. 56; Viktor Alexeevich Stelmakh, ulitsa Kirova, 18, kv. 2; Igor Pavlovich Komnatny, ulitsa Cheljuskintsev, 6; Sergei Vasilievich Yatsenko, Moskovsky prospekt, 204/1, kv. 36; Jury Mikhailovich Bukin, prospekt 50 let VLKSM, 72, kv. 151; Anatoly Egorovich Novikov, ulitsa Tankopia, 34, kv. 37; Sania Fatyakhovna Shaipova, Bulvar B.Khmelnitskogo, 4, kv. 65; Anatoly Nikolaevich Filyanov, ulitsa Kostycheva, 25, kv. 56; Armais Semenovich Shalbaian, pereulok Pilotov, 1a, kv. 12; Vitaly Dmitrievich Grechka, ulitsa Chaikovskogo, 12, kv. 7, all of Kharkov; Nikolai Grigorievich Tsyban, ulitsa R.Ljuxemburg, 116, kv. 4, Nikolaev; Abdulla Gilmutdinovich Gilmutdinov, ulitsa Dekabristov, 38/2, kv. 6, Nikolaev; Fedor Ivanovich Regida, ulitsa Dekabristov, 38/1, kv. 45, Nikolaev; Lidia Evgenievna Kazanovich, ulitsa Teatralnaya, 35, kv. 29, Nikolaev; Nikolai Andreevich Gertsuk, Merefyanskoe shosse, 22, kv. 27, Kharkov; Boris Alexeevich Kolokolov, ulitsa Kommunalnaya, 3a, kv. 9, Kharkov; Anatoly Sergeevich Morgolenko, ulitsa Chkalova, 15, kv. 434, Kharkov; Vladimir Alexandrovich Livanov, ulitsa Sovetskaya, 34, kv. 38; Anatoly Mikhailovich Berezko, shosse Entuziastov, 7, both of Moskovskava oblast, Stupino; Anatoly Avraamovich Petrenko, ulitsa Kibalchicha, 97, Kharkov; Trofim Andrianovich Mikhin, prospekt Pobedy, 22, kv. 54; Mikhail Nikitich Fedotov, ulitsa Chaikovskogo, 23, kv. 29, both of Moskovskaya oblast, Stupino, all of U.S.S.R.; Robert Sharafutdinovich Zakirov, deceased, late of Kharkov, U.S.S.R.; by Ganna Fedgrovna Zakirova, administratix, ulitsa Zapadnaya, 8, kv. 2, Kharkov, U.S.S.R.

[22] Filed: Apr. 10, 1975

[21] Appl. No.: 566,823

[52] U.S. Cl. .................................... 425/1; 249/67; 425/242 R
[51] Int. Cl.[2] ...................... B29C 7/00; B30B 1/38; B30B 15/32
[58] Field of Search .............. 425/1, 242, 247, 249; 249/67, 68

[56] References Cited

UNITED STATES PATENTS

| | | | |
|---|---|---|---|
| 2,272,718 | 2/1942 | MacLogan et al. | 249/67 |
| 3,004,290 | 10/1961 | Toulmin | 425/1 |
| 3,334,378 | 8/1967 | Scherrer-Wing et al. | 249/68 |
| 3,674,386 | 7/1972 | Orth | 425/1 |
| 3,726,625 | 4/1973 | Rees | 249/68 X |

*Primary Examiner*—J. Howard Flint, Jr.
*Attorney, Agent, or Firm*—Holman & Stern

[57] ABSTRACT

A device for briquetting loose materials with the use of impulse energy of detonation, in which there is provided a bed plate on which are mounted movably a housing and an anvil. The housing accommodates an explosion chamber and a first actuating cylinder space communicating with the chamber, with the cylinder rod carrying a plunger. Both the housing and the anvil are mounted on the bed plate with a possibility of rolling back at the moment of explosion along the axis of the first actuating cylinder towards its rod, and arranged in succession intermediate of the housing and anvil are a container having a through axial conduit for material to be briquetted, in which at the moment of explosion, the rod with the plunger are moving, and a die which is integral with the container and in which a briquette is formed under the pressure of the plunger, with the container and the die being aligned axially with the first actuating cylinder. The anvil accommodates actuating cylinders whose axes are parallel to that of the first actuating cylinder, and are spaced at the same distance from its axis with the rods of the actuating cylinders being rigidly connected to the die, and with the container and the first actuating cylinder being each adapted to receive its counterpart member, as required. As a result, during the forward stroke of the rods of the actuating cylinders accommodated within the anvil, the plunger pushes out the finished briquette from the die and during their back stroke the container with the die return the their initial position. The device has a greater output as compared with the known arrangements since it enables auxiliary operations associated with setting the device for the briquetting process to be carried out simultaneously.

6 Claims, 6 Drawing Figures

DEVICE FOR BRIQUETTING LOOSE MATERIALS

BACKGROUND OF THE INVENTION

The present invention relates to devices for a plastic working of materials and more particularly to a device for briquetting loose materials with the use of impulse energy of detonation, developed upon detonation of an explosive mixture in a closed space.

The invention may be most advantageous for briquetting metal turnings, especially, steel turning which, due to their resilience, do not lend themselves readily to pressing in the known arrangements.

Moreover, the invention may find favor in briquetting granulated materials, concentrates, refractories and other particulate materials and in producing blanks and finished articles of any shape with a present accuracy from these materials.

PRIOT ART

Devices are known in the art for briquetting loose materials with the use of impulse energy of detonation, comprising a housing accommodating an explosion chamber and an actuating cylinder space in communication therewith, with the cylinder rod carrying a plunger, and an anvil facing the plunger and rigidly connected to the housing via tie rods.

Both the housing and the anvil are mounted movably on a bed plate with a possibility of rolling back together along the axis of the actuating cylinder towards its rod with the plunger under the effect of recoil upon detonation of the explosive mixture in the explosion chamber.

Arranged in succession intermediate of the anvil and housing are a die and a container aligned axially with the actuating cylinder with the container being set up movably axially and fitted with a through axial conduit which is filled with material to be briquetted and in which at the moment of detonation in the explosion chamber moves the rod with the plunger which acts on the material in the die to form a briquette.

The material to be briquetted is fed into the container conduit in batches by a proportioner in communication with the container.

In such devices for briquetting loose materials the die is rigidly fixed on the anvil with a briquette being formed therein at the moment of detonation in the explosion chamber under the effect of synchronous blows delivered on both sides of the materail being briquetted by the plunger and anvil (due to its recoil together with the housing towards the rod carrying the plunger). To provide for the above recoil, both the housing and the anvil are mounted on the bed plate with roller supports.

Apart from the actuating cylinder that provides the briquetting of the material, the device comprises an actuating cylinder adapted to push out finished briquettes from the die by shifting it axially after the container has been carried off from the die.

The second actuating cylinder is arranged in the anvil coaxially with the actuator contained in the housing and the die bottom is provided with a hole through which the rod of this second actuating cylinder passes.

The container is withdrawn from the die and returned to its initial position by means of two different actuating cylinders mounted on the bed plate while the housing and anvil are returned to their initial position by one more actuating cylinder.

The main disadvantage of the prior-art devices for briquetting loose materials is that they comprise a large number of actuating cylinder operating in succession and adapted to accomplish auxiliary technological operations to set the device for the briquetting process which stipulates a comparatively long duration of these operations and, hence, a low output of the known devices as a whole.

Moreover, since the die bottom has a hole for the rod of the actuating cylinder pushing out the finished briquette from the die, such dies are not applicable for briquetting fine, disperse loose materials, such as, powders, salt, etc., as they can be ejected through the hole during the briquetting operation.

The disadvantage restricting the field of application of such prior devices reside also in that they are not adaptable for briquetting under a vacuum or in a protective gas atmosphere, which deteriorates the quality of articles produced by briquetting loose materials.

Finally, characteristic of the known devices are comparatively large overall dimensions and inadequate rigidity stipulated by the inherent layout of their assemblies.

OBJECT AND SUMMARY OF THE PRESENT INVENTION

The main object of the invention is to provide a device for briquetting loose materials which, due to improvements in the layout of its assemblies, allows reducing the number of actuating cylinders operating in succession, and, hence, enhancing its output and producing briquettes from different loose materials, including fine, disperse ones, which renders these devices versatile.

The above and other objects are achieved in a device for briquetting loose materials with the use of impulse energy of detonation, in which both the housing accommodating an explosion chamber and an actuating cylinder space in communication with the chamber, with the cylinder rod carrying a plunger, and a anvil facing the plunger and rigidly connected to the housing are set up on a bed plate with a possibility of recoiling at the moment of detonation along the axis of the actuating cylinder towards its rod carrying the plunger, and in which a die and a container aligned axially with the cylinder are arranged in succession intermediate of the anvil and housing, the container being movable axially and provided with a through axial conduit which is filled with material being briquetted and in which, upon detonation, moves the rod with the plunger under whose effect a briquette is formed in the die, and provision being made for actuating cylinders adapted for pushing out a finished briquette from the die and for returning the container and the housing with the anvil to their initial position.

According to the invention, these actuating cylinders are so arranged in the anvil that their axes are parallel to that of the actuating cylinder accommodated wtihin the housing and are spaced at the same distance from its axis, while their rods are rigidly connected to the die, that is integral with the container, the with the container and the actuating cylinder accommodated within the housing being each adapted to receive its counterpart member, as required. As a result, during the forward stroke of the rods of the actuating cylinders accommodated in the anvil, the plunger pushes out the finished briquette from the die and during their back stroke, the container with the die are urged tight to the anvil.

Due to the above embodiment, auxiliary operations related to the setting of the device for the next briquetting operation can be effected simultaneously, since both the ejection of the finished briquette from the die and the return of the container to its initial position are accomplished concurrently by the same actuating cylinders arranged in the anvil, which enhances substantially the output of the present device as a whole.

Moreover, the die being integral with the container allows producing briquettes from fine, disperse loose materials, such as, powdered metals, ore concentrates, salt, refractories, etc.

According to one of the possible embodiments of the invention, the external surface of the container is cylinder-shaped, with its diameter being essentially equal to that of the actuating cylinder space which is open to receive the container, and secured intermediate of the anvil and housing is a detent restricting the displacement of the container to a value of recoil of the housing with the anvil to return them to their initial position during the forward stroke of the actuating cylinder rods.

With the above arrangement, it is possible to obviate additional actuators adapted to return the housing an anvil to their initial position and, hence, to increase still more the output of the device, diminish materially its overall dimensions and enhance the rigidity of its construction.

According to another embodiment of the present invention, the diameter of the container conduit is essentially equal to the outside diameter of the actuating cylinder so that the actuating cylinder can enter the conduit, and the bed plate carries an actuating cylinder secured from the external side of the housing and adapted to displace the housing with the anvil to their initial position.

It is expedient that the space of the container conduit be sealed and communicate with a vacuum plant or with a vessel filled with neutral gas.

To seal the container conduit space, the anvil side facing th die can be provided with a cylindrical projection whose diameter is essentially equal to that of the die, with the cylindrical surface of the projection and the exterior of the actuating cylinder near its outside end face being provided with annular grooves for packing rings.

In the second embodiment of the invention, it is sound practice that an annular cavity be formed in the container walls with an electric heater mounted therein.

All these offer a considerable enhancement of the density and strength of the briquettes produced, since the loose material can be heated prior to processing directly in the container conduit and, if required, in an atmosphere of a protective gas or under vacuum.

This, in particular, affords the possibility of briquetting alloy steel turnings or those in titanium-base alloys in a nonscale atmosphere and, what is of prime importance, of using the turnings and powders for the production of parts featuring high physiochemical and mechanical properties and not requiring subsequent machining.

The nature of the invention will be clear from the following detailed description of particular embodiments thereof, to be had in conjunction with the accompanying drawings, in which:

DETAILED DESCRIPTION OF THE EMBODIMENTS

Figure 1:
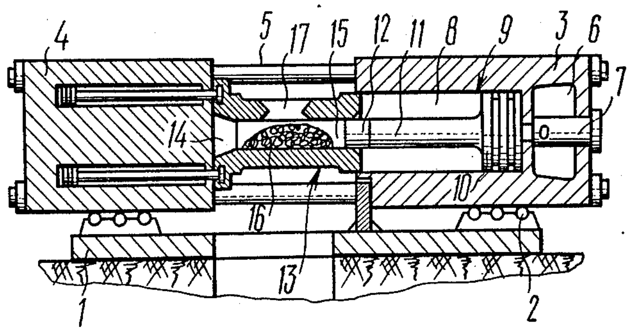
FIG. 1 shows diagrammatically a general view in longitudinal section of the first embodiment of the device for briquetting loose materials, according to the invention, in its initial position.

A device for briquetting loose materials, according to the invention, with the use of impulse energy of detonation, comprising a bed plate 1 (FIGS. 1 through 6), on which a housing 3 and an anvil 4 rigidly interconnected by means of four horizontal tie rods 5 are mounted on rollers 2.

The housing 3 is provided with an explosion chamber 6 and a space 8 of an actuating cylinder 9, and the space 8 is open on the side of the anvil 4, with the space communicating with the explosion chamber 6 through a by-pass valve 7. Arranged within the space 8 is a piston 10 having a rod 11 whose free end carries a plunger 12.

The explosion chamber 6 is connected to an energy carrier source (not shown in the drawing) whose selection is stipulated by the particular service conditions of the present device. As for the energy carrier, use may be made of powder charges, gas-air explosive mixtures, etc.

A container 13 provided with a die 14 is positioned intermediate of the housing 3 and the anvil 4, with the container being aligned axially with the actuating cylinder 9. The container 13 has a through axial conduit or bore 15 charged at regular intervals with batches of a loose material 16 being briquetted, and which material is fed through a charging door 17 provided in the top wall of the container 13 and communicating with a proportioner (not shown in the drawing).

According to this invention, the die 14 is integral with the container 13, its impression being formed by a tapered nest in the end face of the container 13 facing the anvil 4.

At the moment of detonation of the energy carrier in the explosion chamber 6, the rod 11 with the plunger 12 moves in the conduit 15 of the container 13 with a briquette of the loose material 16 being formed in the die 14 under the effect of the plunger 12.

At the same time at the moment of detonation in the explosion chamber 6, the housing 3 with the anvil 4 roll back due to a recoil on the rollers 2 mounted on the bed plate 1 along the axis of the actuating cylinder 9 towards its rod 11 with the plunger 12.

According to the invention, the anvil 14 accommodates four actuating cylinders 19 whose axes are parallel to the axis of the actuating cylinder 9 provided in the housing 3, and are spaced at the same distance from its axis, with rods 20 of the cylinders 19 being rigidly connected to the end face of the die 14. The container 13 and the actuating cylinder 9 accommodated within the housing 3 are each adapted to receive its counterpart member, as required.

In the first embodiment of the device (FIGS. 1 through 3), according to the invention, with the external surface of the container 13 is cylinder-shaped, its diameter being essentially equal to the diameter of the space 8 of the actuating cylinder 9 and the space 8 is open on the side of the anvil 4 to receive the container 13 entering it under the effect of the rods 20 of the actuating cylinder 19. In this embodiment of the device (FIGS. 1 through 3), a detent 21 is secured intermediate of the anvil 4 and the housing 3 on the bed plate 1 and the detent 21 restricts the displacement of the container 13 to a value "S" which is the recoil of the housing 3 with the anvil 4. With the above arrangement, during the forward stroke of the rods 20 of the actuating cylinders 19 shifting the container 13 axially, the plunger 12 pushes out the finished briquette from the die 14 with the housing 3 and the anvil 4 being returned to their initial position.

During the back stroke of the rods 20 of the actuating cylinders 19, the contaier 13 with the die 14 is held tight to the anvil 4.

In the second embodiment of the device (FIGS. 4 through 6), the diameter of the axial conduit 15 in the container 13 is essentially equal to the outside diameter of the actuating cylinder 9 to receive the cylinder 9 when the container 13 is shifted axially under the effect of the rods 20 of the actuating cylinder 19 at a distance equal to the stroke of the rod 11 with the plunger 12. As a result, the plunger 12 pushes out the finished briquette 18 from the die 14.

In this embodiment, an actuating cylinder 22 is secured on the bed plate 1 on the external side of the housing 3 and the cylinder 22 is adapted to transfer the housing 3 with the anvil 4 to their initial position.

In the second embodiment (FIGS. 4 through 6) of the device, the space of the conduit 15 in the container 13 is sealed and connected to a vacuum plant or a vessel with a neutral gas (not shown in the drawing) through a branch pipe 23.

To seal the space of the conduit 15 in the container 13, the anvil 4 from the side of the die 14 is provided with a cylindrical projection 24 having a diameter essentially equal to the diameter of the die 14. The cylindrical surface of the projection 24 on the anvil 4 and the exterior of the actuating cylinder 9 near its outside end face have annular grooves for receiving packing rings 25.

The walls of the container 13 have an annular space 26 accommodating an electric heating coil 27.

The device for briquetting loose materials operates in the following manner:

In both embodiments of the present device, in the initial position (FIGS. 1 and 4), the housing 3 with the anvil 4 and the piston 10 with the rod 11 and plunger 12 of the actuating cylinder 9 are set to their extreme right-hand position, with the container 13 being placed in the extreme left-hand position.

In this position, the rods 20 of the actuating cylinders 19 arranged within the anvil 4 are retracted and the die 14 is urged tight against the anvil 4.

The working cycle of the device is initiated with the batch of the loose material 16 to be briquetted being fed by the proportioner into the conduit 15 of the container 13 through its charging door 17.

Next, the explosion chamber 6 is connected to the energy carrier (gas-air mixture) source with the mixture being detonated as soon as the by-pass valve 7 is closed.

The high-pressure gases generated upon detonation, enter (through the open valve 7) the space 8 of the actuating cylinder 9 beneath its piston 10. Under the effect thereof piston 10, the rod 11 and the plunger 12 move in the conduit 15 of the container 13 with a progressing speed to the left (as shown in FIGS. 2 and 5) shifting the batch of the loose mmaterial 16 fed into the conduit 15 in the same direction and compacting the material in the die 14 into the briquette 18.

At the same time, the housing 3 with the anvil 4 ride on the rollers 2 due to the recoil with respect to the bed plate 1 along the axis of the actuating cylinder 9 toward the rod 11 carrying the plunger 12.

Figure 2:
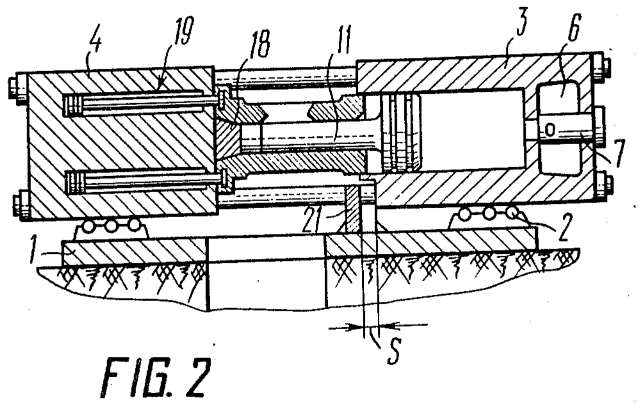
FIG. 2 is a similar view at the moment of completion of the briquetting process.
Figure 5:
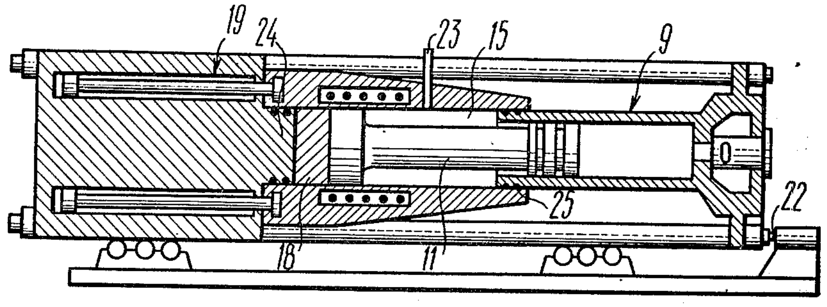
FIG. 5 is a similar view at the moment of completion of the briquetting process.

At the moment the briquette 18 is formed, the housing 3 with the anvil 4 are set to their extreme right-hand position (FIGS. 2 and 5).

In the first embodiment (FIG. 2) of the device, a clearance equal to the value "S" of the recoil of the housing 3 with the anvil 4 is formed between the housing 3 and the detent 21.

Figure 3:
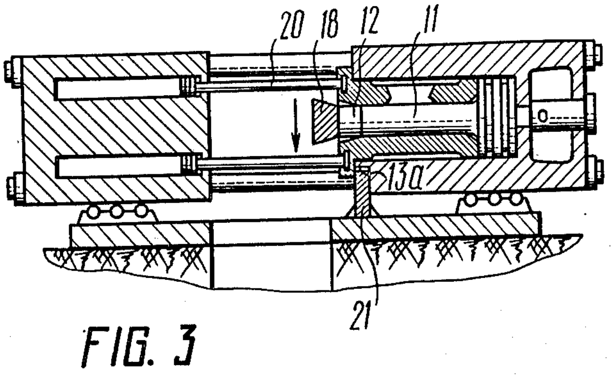
FIG. 3 is a similar view at the moment a finished briquette is pushed out from the die with the housing and anvil being returned to their initial position.
Figure 6:
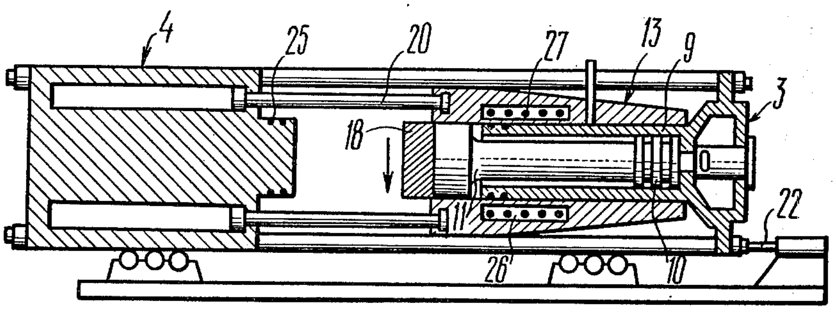
FIG. 6 is a similar view at the moment of ejection of a finished briquette from the die.

Thereafter, the rods 20 of the actuating cylinders 19 accommodoated within the anvil 4 are advanced with the container 13 moving under the effect of these rods 20 to the extreme right-hand position (FIGS. 3 and 6).

In the first embodiment of the device (FIG. 3), the container 13 enters the space 8 of the actuating cylinder 9 entraining the rod 11 and at the moment when the piston 10 of the actuating cylinder 9 strikes against its bottom, the plunger 12 will push out the finished briquette 18 from the die 14 with the briquette falling by gravity through a hole in the bed plate 1 into a receiver (not shown in the drawing).

At the same time an outside flange 13*a* (FIG. 3) of the container 13 will thrust against the detent 21 on the bed plate 1 and as the rods 20 of the actuating cylinders 19 advance farther to the right, the housing 3 with the anvil 4 will move to the left (FIG. 3) by the value S of their recoil, i.e. to their initial position.

In the second embodiment (FIG. 6) of the present device (when the rods 20 of the actuating cylinder 19 are advanced), the container 13 with the rod 11 of the actuating cylinder 9 will move to the extreme right-hand position (FIG. 6) with the actuating cylinder 9 entering the conduit 15 of the container 13.

At the moment when the piston 10 of the actuating cylinder 9 strikes against its bottom, the plunger 12 pushes out the finished briquette 18 from the die 14 with the briquette falling into the receiver (not shown in the drawing).

Figure 4:
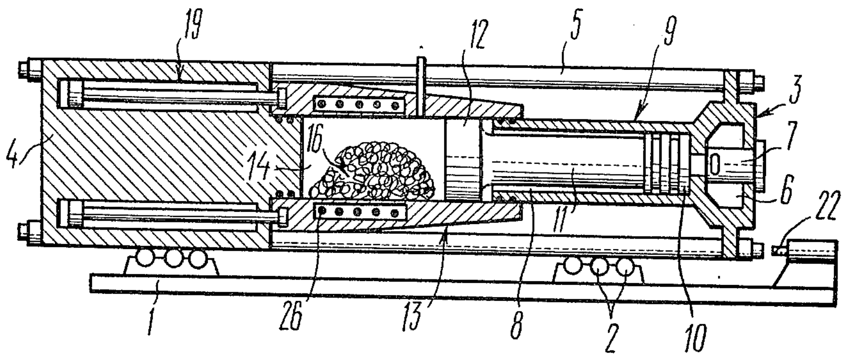
FIG. 4 is a general view in longitudinal section of the second embodiment of the device, according to the invention, in its initial position.

In both embodiments, when the rods 20 of the actuating cylinders 19 are retracted, the container 13 returns to its initial position (FIGS. 1 and 4).

In the second embodiment, the housing 3 with the anvil 4 are shifted to their initial position by the rod of the actuating cylinder 22 carried by the bed plate 1.

Thereafter, the device of both embodiments is set for the next cycle (FIGS. 1 and 4).

The specific features of the operation of the device, according to the second embodiment (FIGS. 4 through 6), reside in that upon charging the batch of the material 16 to be briquetted into the conduit 15 of the container 13, the space of this conduit 15 is sealed by the packing rings 25 with a neutral gas being fed therein via the branch pipe 23. If required, the heating electric coil 26 is activated. After the batch of the loose material 16 has been heated to a preset temperature, it is briquetted by following the above-outlined sequence of operations. As soon as a briquette 18 (FIG. 5) is formed, the supply of the neutral gas into the conduit 15 of the container 13 is stopped and briquette 18 is pushed out from the die 14 as above described.

The device for briquetting loose materials, according to the invention, has a higher output as compared with the known devices of the same type. It is also more compact and features a higher rigidity in terms of its construction.

The provision of the electric heating coil 27 for the container 13 and the possibility of sealing its conduit 15 enables an enhancement in briquette quality. It also made it possible to use loose materials, including fine, disperse materials, for producing not only semifinished stock for further processing, but finished pieces featuring high physicochemical, mechanical and service characteristics.

All these factors predetermine high performance characteristics of the present device.

The invention is not to be confined to any strict conformity to the showings in the drawings but changes or modifications may be made therein so long as such changes or modifications mark no material departure from the spirit and scope of the appended claims.

What we claim is:

1. A device for briquetting loose materials with the use of impulse energy of detonation, comprising: a bed plate; a housing mounted on said bed plate; an explosion chamber provided within said housing and communicating at regular intervals with an energy carrier source; a first actuating cylinder within said housing with the cylinder space being, at the moment of detonation of the energy carrier in said explosion chamber, connected thereto; a piston having a rod contained within the space of said first actuating cylinder and moving therein under the effect of the detonation energy generated in said explosion chamber; a plunger fixed on the rod; an anvil mounted on said bed plate at a distance from said housing on the side of said pounger and rigidly connected to said housing; said housing and anvil being mounted on said bed plate with a possibility of rolling back at the moment of explosion along the axis of said first actuating cylinder towards its rod; a container arranged intermediate of said housing and anvil, said container being aligned axially with said first actuating cylinder and provided with a through axial conduit which is filled with a batch of material to be briquetted and in which at the moment of detonation, moves said rod with the plunger; a die positioned intermediate of said anvil and container and integral therewith; with a briquette being formed in said die under the effect of the plunger; actuating cylinders provided within said anvil with the axis thereof being parallel to the axis of said first actuating cylinder within said housing and being spaced at the same distance from the axis of the first actuating cylinder; said actuating cylinders having rods, the rods of said actuating cylinders being connected rigidly to said die; said container and first actuating cylinder within said housing adapted each to receive its counterpart member, as required, during the axial displacement of said container under the effect of said actuating cylinders, through which the plunger pushes out the finished briquette from said die during the forward stroke of the rods of the actuating cylinders while during their back stroke, said container with the die are urged tight against said anvil.

2. The device as claimed in claim 2, in which the external surface of the container is cylinder-shaped and its diameter is essentially equal to the diameter of the space of the first actuating cylinder, with such cylinder being open on the anvil side to receive the container, including a detent secured on the bed plate intermediate of the anvil and housing, with said detent restricting the displacement of the container by the value of recoil of the housing with the anvil to return them to their initial position during the forward stroke of the rods of the actuating cylinders.

3. The device as claimed in claim 1, in which the diameter of the axial conduit of the container is essentially equal to the outside diameter of the first actuating cylinder so that the first actuating cylinder can enter the conduit, including a further actuating cylinder fastened to the bed plate on the external side of the housing for shifting the housing with the anvil to its initial position.

4. The device as claimed in claim 3, in which the space of the container conduit is sealed and communicates with a vacuum plant or with a vessel with neutral gas.

5. The device as claimed in claim 4, in which for sealing the space of the container conduit, the anvil has, on the side of the die a cylindrical projection having a diameter essentially equal to the diameter of the die with the cylindrical surface of the projection and the external surface of the first actuating cylinder near its outside end face being provided with annular grooves to accommodate packing rings.

6. The device as claimed in claim 4, in which an annular space is provided in the container walls and an electric heating coil is accommodated in the annular space.

* * * * *